(12) United States Patent
Long et al.

(10) Patent No.: US 9,903,242 B2
(45) Date of Patent: Feb. 27, 2018

(54) SCAVENGE PUMP OIL LEVEL CONTROL SYSTEM AND METHOD

(71) Applicant: Allison Transmission, Inc., Indianapolis, IN (US)

(72) Inventors: Charles F. Long, Pittsboro, IN (US); Thomas A. Wright, Noblesville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/194,638

(22) Filed: Jun. 28, 2016

(65) Prior Publication Data
US 2016/0305294 A1    Oct. 20, 2016

Related U.S. Application Data

(60) Division of application No. 14/564,505, filed on Dec. 9, 2014, which is a division of application No. (Continued)

(51) Int. Cl.
*F01M 11/06* (2006.01)
*B60W 10/02* (2006.01)
(Continued)

(52) U.S. Cl.
CPC ............ *F01M 11/061* (2013.01); *B60K 6/48* (2013.01); *B60W 10/023* (2013.01);
(Continued)

(58) Field of Classification Search
CPC .......... F04B 49/20; F04B 51/00; F04B 23/00; F16H 57/0447; F16D 33/18; F16D 2300/06; B60W 10/30; B60K 6/48

USPC ............. 417/36, 38–39, 41; 74/730.1, 732.1, 74/733.1; 701/51, 22, 29.1; 123/196 R, 123/196 A, 196 CP, 196 AB, 196 M, 123/196 S, 196 V, 196 W
See application file for complete search history.

(56) References Cited

U.S. PATENT DOCUMENTS 3,800,913 A * 4/1974 Schmitt ................. F01M 1/12
                                                184/6.13
5,651,391 A    7/1997 Connolly et al.
(Continued)

FOREIGN PATENT DOCUMENTS

JP        2000337119    * 12/2000

OTHER PUBLICATIONS

Translation of JP2000337119; "Lubrication Control Device for Engine"; Dec. 5, 2000; Inventor—Shimazaki Yuichi.*

*Primary Examiner* — Devon Kramer
*Assistant Examiner* — Lilya Pekarskaya
(74) *Attorney, Agent, or Firm* — Woodard Emhardt Moriarty McNett & Henry LLP (57) ABSTRACT

A hybrid vehicle includes a hybrid module, a transmission and a torque converter. The lubrication system associated with the torque converter includes an oil sump within the torque converter housing which is intended to be managed as a "dry" sump oil lubrication system. There is an oil pump in communication with the sump in order to manage the sump oil level. By monitoring an operational parameter of the oil pump motor (pressure, torque, or current) oil aeration can be detected.

18 Claims, 5 Drawing Sheets

Related U.S. Application Data

13/735,463, filed on Jan. 7, 2013, now abandoned, which is a continuation of application No. PCT/US2012/024119, filed on Feb. 7, 2012.

(60) Provisional application No. 61/440,878, filed on Feb. 9, 2011.

(51) Int. Cl.

| | | |
|---|---|---|
| *B60W 10/30* | (2006.01) | |
| *B60W 20/00* | (2016.01) | |
| *B60W 50/04* | (2006.01) | |
| *F16H 41/30* | (2006.01) | |
| *F04B 23/00* | (2006.01) | |
| *B60K 6/48* | (2007.10) | |
| *F16H 57/04* | (2010.01) | |
| *F04B 49/20* | (2006.01) | |
| *F04B 51/00* | (2006.01) | |
| *F04B 23/02* | (2006.01) | |

(52) U.S. Cl.
CPC ............ *B60W 10/30* (2013.01); *B60W 20/00* (2013.01); *B60W 50/045* (2013.01); *F04B 23/00* (2013.01); *F04B 49/20* (2013.01); *F04B 51/00* (2013.01); *F16H 41/30* (2013.01); *F16H 57/0447* (2013.01); *F04B 23/02* (2013.01); *F04B 23/021* (2013.01); *Y02T 10/6221* (2013.01)

(56) References Cited

U.S. PATENT DOCUMENTS

| | | |
|---|---|---|
| 5,890,509 A | 4/1999 | Becker et al. |
| 2004/0062658 A1* | 4/2004 | Beck .................... E21B 43/126 417/42 |
| 2005/0256626 A1 | 11/2005 | Hsieh et al. |
| 2007/0240919 A1* | 10/2007 | Carlson .................. B60K 25/00 180/53.4 |
| 2009/0253544 A1 | 10/2009 | Foster et al. |

* cited by examiner

SCAVENGE PUMP OIL LEVEL CONTROL SYSTEM AND METHOD

CROSS REFERENCE TO RELATED APPLICATION

This application is a divisional of U.S. patent application Ser. No. 14/564,505 filed Dec. 9, 2014, which is a divisional of U.S. patent application Ser. No. 13/735,463, filed Jan. 7, 2013 which is a continuation of PCT Application No. PCT/US2012/024119, filed Feb. 7, 2012, which claims the benefit U.S. Patent Application Ser. No. 61/440,878 filed Feb. 9, 2011, all of which are hereby incorporated by reference.

BACKGROUND

With the growing concern over global climate change as well as oil supplies, there has been a recent trend to develop various hybrid systems for motor vehicles. While numerous hybrid systems have been proposed, the systems typically require significant modifications to the drive trains of the vehicles. These modifications make it difficult to retrofit the systems to existing vehicles. Moreover, some of these systems have a tendency to cause significant power loss, which in turn hurts the fuel economy for the vehicle. Thus, there is a need for improvement in this field.

One of the areas for improvement is in the construction and arrangement of the hydraulic system. Hybrid vehicles, and in particular the hybrid module associated with such a vehicle, have various lubrication and cooling needs which depend on engine conditions and operational modes. In order to address these needs, oil is delivered by at least one hydraulic pump. The operation of each hydraulic pump is controlled, based in part on the lubrication and cooling needs and based in part on the prioritizing when one or more hydraulic pump is included as part of the hydraulic system of the hybrid vehicle. The prioritizing between hydraulic pumps is based in part on the needs and based in part on the operational state or mode of the hybrid vehicle.

Another area for improvement within the overall hydraulics of the hybrid vehicle is in the management of the oil level within the torque converter housing. An electric oil pump is used as a scavenge pump for the oil sump of the torque converter housing. The scavenge pump is part of a "dry" sump oil lubrication system which requires that the collecting oil sump pan be kept relatively dry compared to what is generally understood as a wet sump oil lubrication system.

One of the concerns relating to dry sump configurations and systems is oil aeration which occurs when too little oil is present in the oil sump. This is the result of excessive scavenging. Another concern is oil flooding which occurs when too much oil is present in the oil sump. This is the result of insufficient or inadequate scavenging. Related concerns are the monetary and energy costs associated with maintaining an oil level sensor in the sump. The control system described herein addresses the first two concerns by monitoring the scavenge pump and adjusting the scavenge pump performance to try and maintain a desired oil level in the sump.

SUMMARY

The hydraulic system (and method) described herein is part of a hybrid module used within a hybrid system adapted for use in vehicles and suitable for use in transportation system and into other environments. The cooperating hybrid system is generally a self-contained and self-sufficient system which is able to function without the need to drain resources from other systems in the corresponding vehicle or transportation system. The hybrid module includes an electric machine (eMachine).

This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system, which can act as a lubricant, hydraulic fluid, and/or coolant, includes a mechanical pump for circulating a fluid, along with an electric pump that supplements workload for the mechanical pump when needed. As will be explained in further detail below, this dual mechanical/electric pump system helps to reduce the size and weight of the required mechanical pump, and if desired, also allows the system to run in a complete electric mode in which the electric pump solely circulates the fluid.

More specifically, the described hydraulic system (for purposes of the exemplary embodiment) is used in conjunction with a hybrid electric vehicle (HEV). Included as part of the described hydraulic system is a parallel arrangement of a mechanical oil pump and an electric oil pump. The control of each pump and the sequence of operation of each pump depends in part on the operational state or the mode of the hybrid vehicle. Various system modes are described herein relating to the hybrid vehicle. As for the hydraulic system disclosed herein, there are three modes which are specifically described and these three modes include an electric mode (E-mode), a transition mode, and a cruise mode.

As will be appreciated from the description which follows, the described hydraulic system (and method) is constructed and arranged for addressing the need for component lubrication and for cooling those portions of the hybrid module which experience an elevated temperature during operation of the vehicle. The specific construction and operational characteristics provide an improved hydraulic system for a hydraulic module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the hydraulic fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a dam and slinger arrangement. Specifically, the hybrid module has a impeller blade that propels the fluid back into the eMachine through a window or opening in a dam member. Subsequently, the fluid is then drained into the sump so that it can be scavenged and recirculated.

The hybrid module has a number of different operational modes. During the start mode, the battery supplies power to the eMachine as well as to the electric pump. Once the electric pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

Focusing now on the torque converter portion of the HEV, the oil sump of the torque converter housing is constructed and arranged to be scavenged by an electric oil pump. The goal is to keep the sump of the torque converter housing "dry" without having excessive aeration and without flooding. Excessive aeration is typically the result of excessive scavenging. Flooding is typically the result of insufficient or inadequate scavenging. Instead of incurring the monetary cost and the energy cost associated with adding an oil level sensor to the torque converter sump, the described control system focuses on the status and performance characteristics of the electric oil pump.

One oil pump monitoring and adjusting option is to evaluate the pump torque (sensed by current) and then vary the pump speed, as needed, to try and maintain the sump oil level within the desired range. Another oil pump monitoring and adjusting option is to vary the pump speed based on pump torque oscillations (sensed by current readings). A still further oil pump monitoring and adjusting option is to vary the pump speed based on the presence of pump speed oscillations.

By utilization of one of the monitoring and adjusting options, one or more of the following benefits is expected:
1. Reduced oil aeration.
2. Reduced main oil sump level variation.
3. Sandwich sump oil level closed loop control.
4. Reduced spin losses.
5. Improved fuel economy.
6. Avoid excessive pressurization of downstream components.
7. Reduced cost (eliminates need for oil level sensor).

Further forms, objects, features, aspects, benefits, advantages, and embodiments of the present invention will become apparent from a detailed description and drawings provided herewith.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 1:
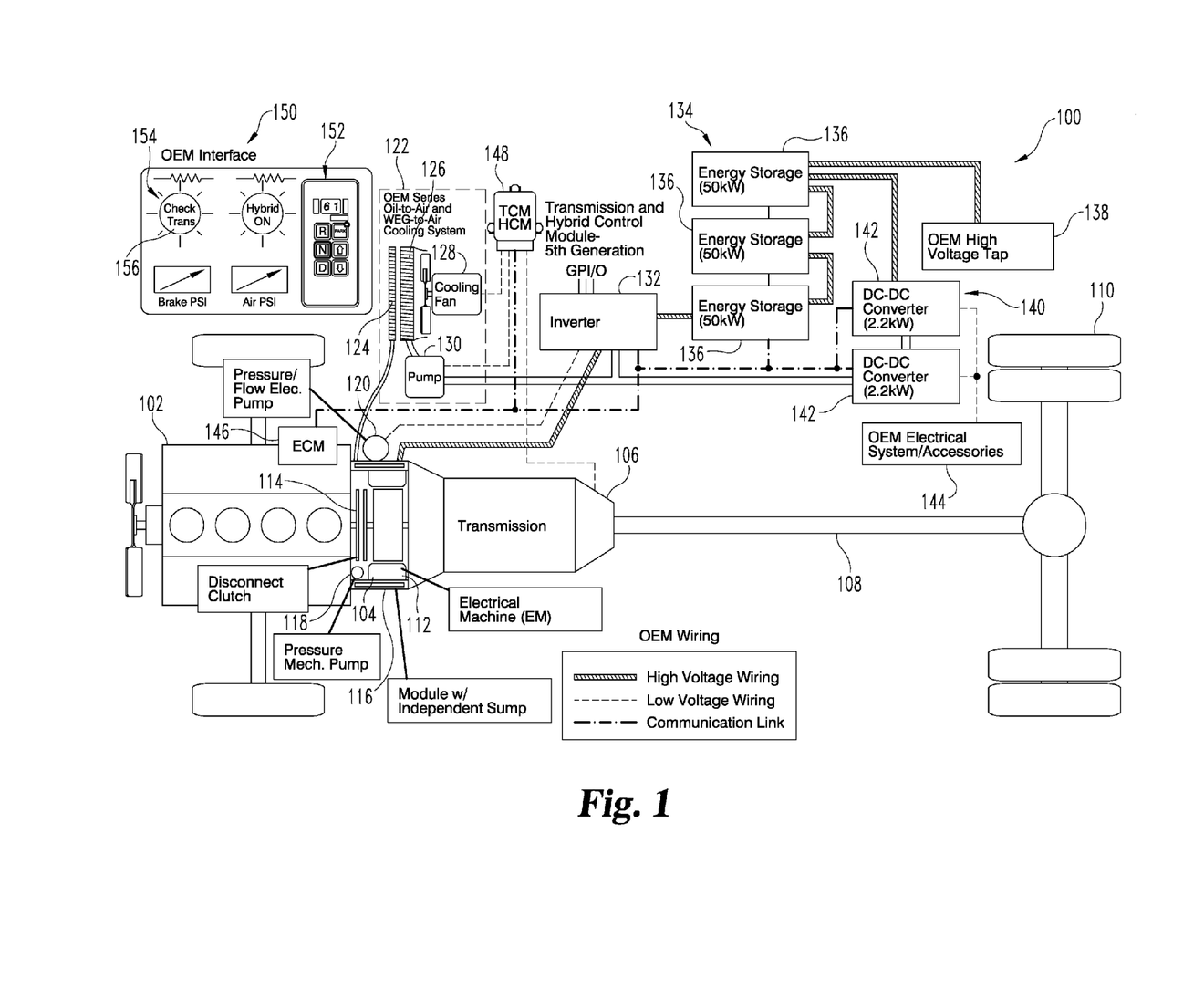
FIG. 1 illustrates a diagrammatic view of one example of a hybrid system

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 with the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant or lube will be used interchangeably herein, these terms are used in a broader sense to include various types of lubricants, such as natural or synthetic oils, as well as lubricants having different properties. To circulate the fluid, the hybrid module 104 includes a mechanical pump 118 and an electric pump 120 in cooperation with a hydraulic system 200 (see FIG. 2). With this parallel combination of both the mechanical pump 118 and electric pump 120, the overall size and, moreover, the overall expense for the pumps is reduced. The electric pump 120 cooperates with the mechanical pump 118 to provide extra pumping capacity when required. The electric pump 120 is also used for hybrid system needs when there is no drive input to operate the mechanical pump 118. In addition, it is contemplated that the flow through the electric pump 120 can be used to detect low fluid conditions for the hybrid module 104. In one example, the electric pump 120 is manufactured by Magna International Inc. of Aurora, Ontario, Canada (part number 29550817), but it is contemplated that other types of pumps can be used.

The hybrid system 100 further includes a cooling system 122 that is used to cool the fluid supplied to the hybrid module 104 as well as the water-ethylene-glycol (WEG) to various other components of the hybrid system 100. In one variation, the WEG can also be circulated through an outer jacket of the eMachine 112 in order to cool the eMachine 112. Although the hybrid system 100 has been described with respect to a WEG coolant, other types of antifreezes and cooling fluids, such as water, alcohol solutions, etc., can be used. With continued reference to FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module (ECM) 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit require, then, vehicle and product line modifications and expensive testing to ensure the proper operation and safety of the vehicle, and this expense tends to lessen or slow the adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Further details regarding the hybrid system 100 and its various subsystems, controls, components and modes of operation are described in Provisional Patent Application No. 61/381,615, filed Sep. 10, 2010, which is hereby incorporated by reference in its entirety.

The hybrid module 104 is generally designed to be a self-contained unit and accordingly it has its own lubrication system. When the hybrid module 104 is coupled to the transmission 106, some leakage of the fluid into the transmission 106 may occur. The fluid (e.g., oil) may flow into parts of the transmission that are normally dry or absent fluid. For instance, fluid may flow into the area surrounding the torque converter 172. As a result, the viscous nature of the fluid can slow down the torque converter 172 and/or create other issues, such as parasitic loss and over heating of the oil. Moreover, if enough fluid exits the hybrid module 104, an insufficient amount of fluid may exist in the hybrid module 104, which can cause damage to its internal components.

At the interface between the hybrid module 104 and the transmission 106, the hybrid module 104 has a dam and slinger (or impeller) arrangement that is used to retain the fluid within the hybrid module. An adapter ring has a slinger blade that is designed to sling the fluid back into the hybrid module 104. A sleeve has a dam structure that is used to retain the fluid and direct it to the sump 116. The dam structure has a dam passageway positioned such that the slinger blade is able to direct the fluid through the dam passageway and subsequently into the sump 116.

Figure 2:
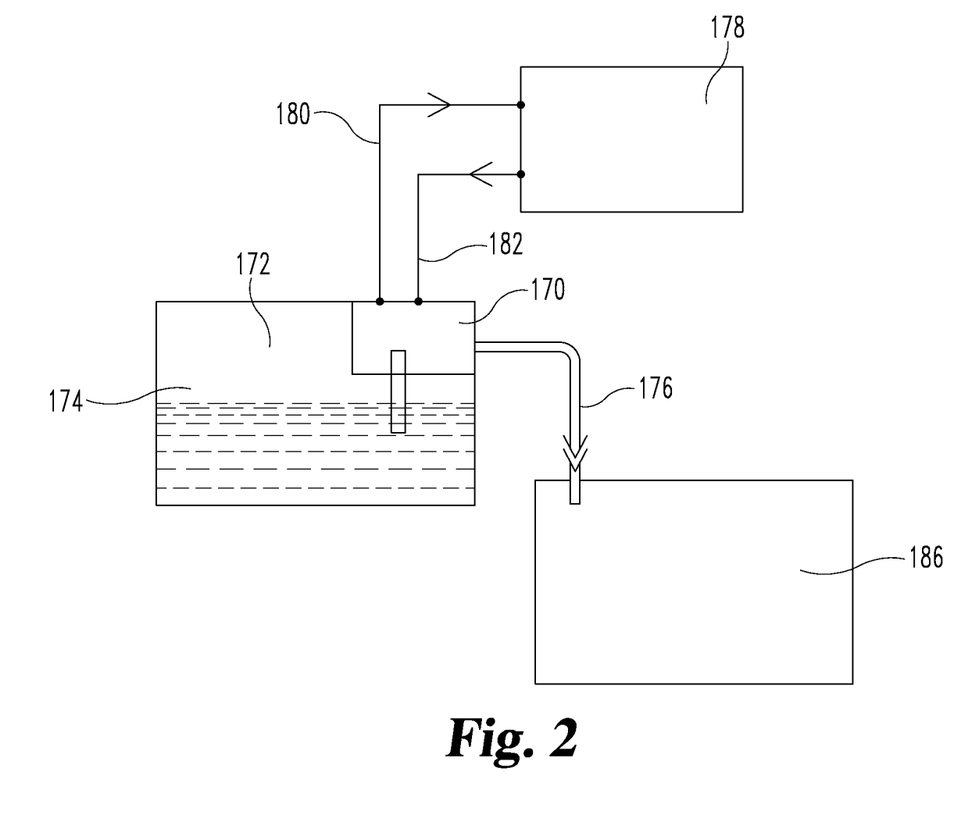
FIG. 2 is a schematic illustration of the oil flow and control logic associated with a torque converter which is a part of the FIG. 1 hybrid system.

Referring now to FIG. 2, a schematic diagram is provided for the described monitoring and adjusting of electric oil pump 170 which is operably connected to (i.e., in flow communication with) torque converter 172. The torque converter 172 receives a supply of oil for lubrication and cooling of the torque converter components and portions within the torque converter housing. The used and excess oil drains off and accumulates in the lower pan or sump 174 of the torque converter. The electric oil pump 170 is constructed and arranged as a scavenging pump in order to pump oil out of the sump 174 and return that oil to a larger oil reservoir 186 via conduit 176.

The level of oil in sump 174 is a factor of delivery, flow rate, and the speed of electric oil pump 170. There are two conditions which are seen as performance issues and which should be corrected or resolved by changing the speed of the electric oil pump. One condition or concern is described as oil aeration which is the result of excessive scavenging. If the oil level is too low as scavenging continues, the electric oil pump draws in a mixture of air and oil. The other condition or concern is described as "flooding" which is the result of inadequate scavenging. Flooding is also seen as a high oil level in the torque converter housing, i.e., in sump 174.

When oil level is relatively low, the hybrid system has the potential for drawing air into the intake of the pump. At moderately reduced oil levels, this can manifest itself as a localized whirlpool effect which introduces air gradually into the system through the intake of the oil suction filter. The whirlpool effect is dependent on oil velocity and temperature. Higher velocities in combination with higher viscosities present the biggest issue. This would most likely occur on cold start at higher engine speeds. As a result of this air induction, the entrained air level in the oil increases. This can lead to regulator valve instability (noisy pressure), elevated oil temperatures, longer clutch fill times, and minor shift quality issues.

At severely low oil levels the bottom of the oil suction filter is uncovered to air in a more general sense. This results in sever ingestion of air to the suction side of the pump. The aforementioned issues become more pronounced and there is the potential for pump priming issues as well. Regulator valve instability can increase to the point of audible noise which can be heard by the operator. Elevated temperatures are more pronounced and can lead to transmission overheating.

Generally high oil levels result in oil contact with moving parts within the gearbox itself. With moderate overfills it results in foaming and aeration with mild increases in spin losses. This can also lead to minor increases in oil temperature. With significantly high oil levels, the foaming and aeration results in much higher spin losses (reduced fuel economy) and transmission overheating. The problem tends to self propagate at this point. The foaming expands the oil volume and level resulting in further foaming which leads to still higher oil levels. Eventually the foaming and aeration can result in spewing out the breather and severe overheating.

Each condition is able to be rectified by changing the speed of the electric oil pump 170. In the event of oil aeration, slow down the pump speed. In the event of flooding, increase the pump speed. The question then becomes how best to monitor and determine the oil level in the sump of the torque converter. One option is to add an oil level sensor. However, this option introduces an added monetary cost and an added energy cost. Instead, the disclosed exemplary embodiment introduces improvement options, each of which involve monitoring operating parameters or conditions of the electric oil pump 170.

A first improvement option is to vary the speed of oil pump 170 based on the torque of the oil pump which is sensed by a current reading from the pump motor. In FIG. 2, control module 178 communicates with the oil pump 170 via data line 180 in order to sense the current and derive a reading. This current reading is then used to determine if the speed of oil pump 170 needs to be varied and, if so, how. The speed of oil pump 170 is increased by control module 178 via data line 182 if the current reading indicates flooding of the torque converter 172. If the current reading indicates oil aeration, then the speed of oil pump 170 is decreased by a signal from control module 178 via data line 182.

Figure 3:
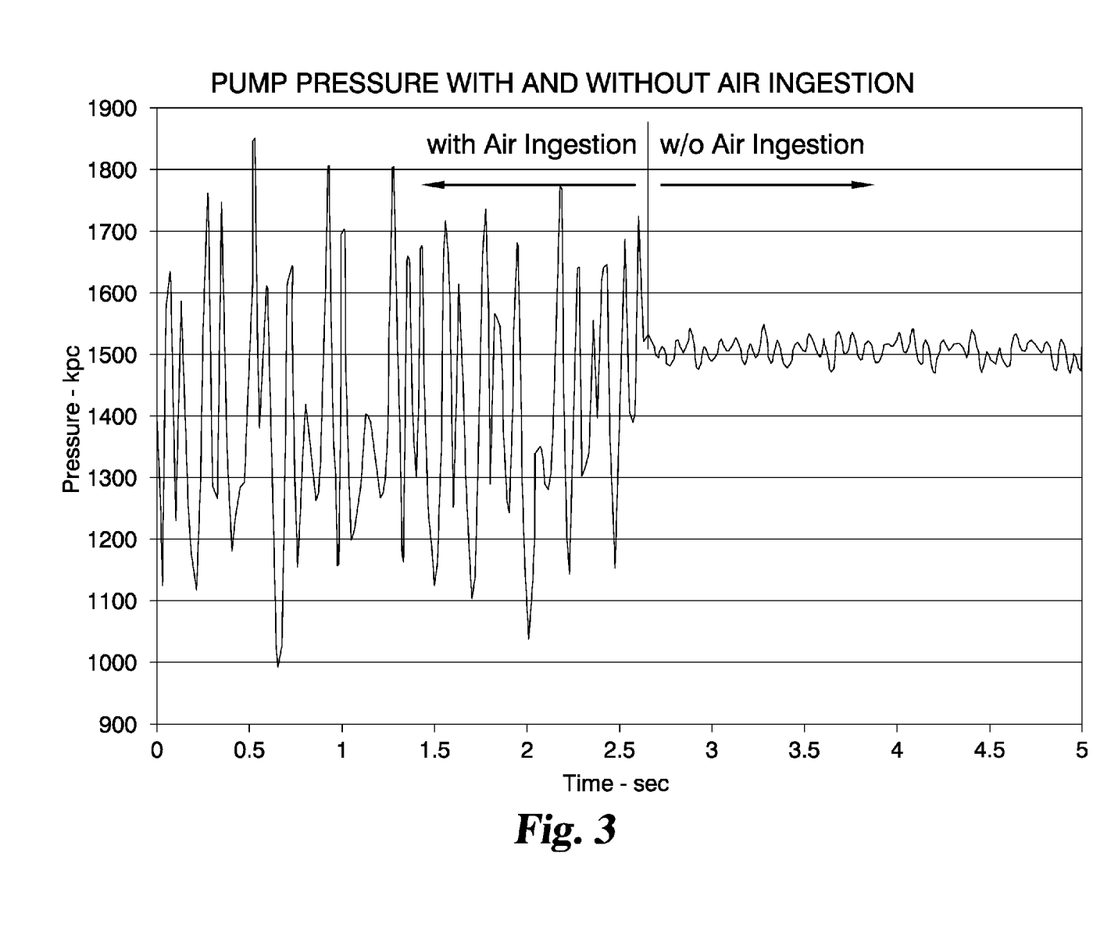
FIG. 3 is a graph of pump pressure versus time as a way to assess air ingestion.

When the oil level is low, there is the potential for drawing air into the intake of the scavenge pump. This air ingestion into the scavenge pump may also be described as aeration. When this occurs, the pump mass flow rate drops and tends to be inconsistent (noisy). One way this effect can be "seen" is by measuring the pressure over time. The FIG. 3 graph or chart depicts one option for displaying this pressure. The Y-axis depicts "pressure" in kpa units. The X-axis is "time" in seconds. The magnitude or extent of the pressure fluctuations gives an indication of whether or not there is any significant air ingestion by the scavenge pump. While the FIG. 3 graph shows pressure versus time, torque or current measurements of the scavenge pump will provide a similar display of whether or not there is any significant air ingestion by the scavenge pump.

The vehicle includes a transmission control module (TCM) which is constructed and arranged to monitor the range of (pressure) oscillations and calculate the peak-to-peak noise versus time. This is displayed by the FIG. 4 graph. This graph displays the peak-to-peak pressure in kpa units along the Y-axis and time, in seconds, along the X-axis. The TCM is capable of monitoring the peak-to-peak noise and flag aeration when the noise threshold exceeds a calibrated level.

Figure 4:
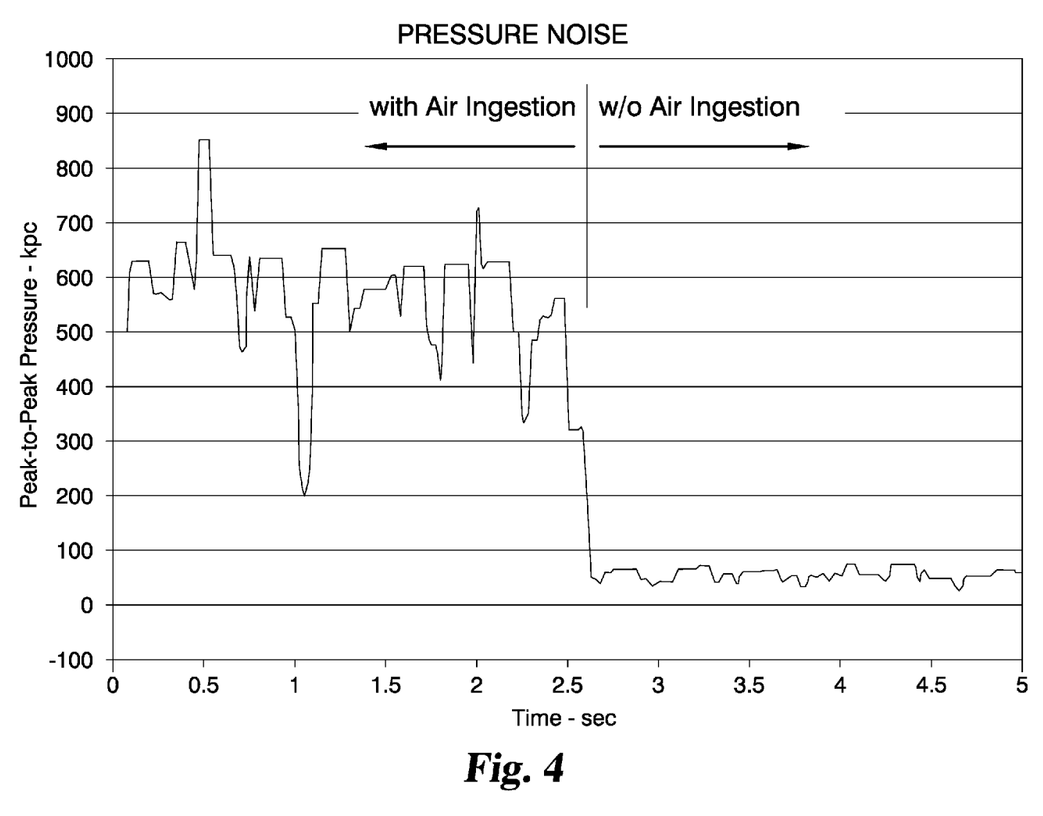
FIG. 4 is a graph of peak-to-peak pressure versus time as a way to present air ingestion information.

The analysis can be taken a further step by integrating the FIG. 4 graph data with respect to time. This integration result is shown by the FIG. 5 graph. The slope of the line depicts the condition, noting that a steeper slope corresponds to some level of air ingestion while a flatter line of less slope corresponds to a condition of little or no air ingestion by the scavenge pump.

Figure 5:
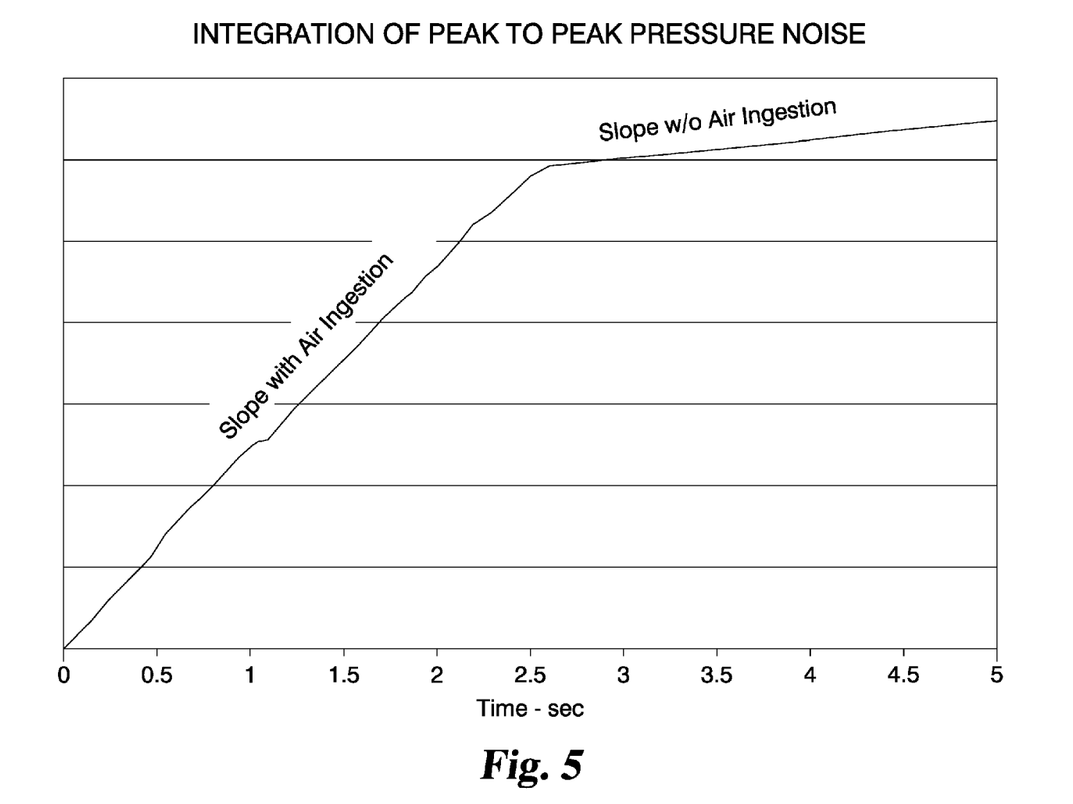
FIG. 5 is a graph of the integration of the FIG. 4 information versus time using the slope of the line to denote air ingestion information.

The FIG. 5 graph provides a clear distinction, based on the slope of the line, of when air is ingested (the steeper slope) and when no noticeable amount or volume of air is ingested (the flatter slope). By calibrating the slope and establishing a reference table (or using one already created), a measurement of the slope of the FIG. 5 graph line will yield the level (i.e., the amount or volume) of air ingested by the scavenge pump. Relative measures are given in Table I which corresponds to FIG. 5.

TABLE I

| Integration Slope | Air Entrainment |
|---|---|
| 0.2 | <2% |
| 0.3 | 3% |
| 0.4 | 4% |
| 0.5 | 5% |
| 0.6 | 6% |
| 0.7 | >7% |

As noted above, the data displayed in the graphs of FIGS. 3-5 is based on pressure readings and the peak-to-peak pressure readings. However, in lieu of using pressure, scavenge pump torque measurements will provide a similar response and way to assess air ingestion (i.e., aeration). The same is true for scavenge pump current measurements. Depending on the existence or level of any oil aeration (i.e., air ingestion), the speed of the oil pump 170 can be varied. Ideally for a "dry" sump, the oil level will be managed such that it is controlled at the point where aeration might just start. If that is not indicated, then increase the pump speed. Once aeration is detected, then slow the speed of the pump. This somewhat continual adjusting of the pump speed is one way to keep the oil level at the threshold of aeration which is a suitable way to manage a "dry" sump. Referring to FIG. 2, the control module 178 communicates with the oil pump 170 via data line 182. Readings from the oil pump motor are received by the control module via data line 180. These connections are important in order to obtain the data and control scavenge pump operation.

By controlling the scavenge pump speed through the monitoring of the pump motor and/or the monitoring of pump pressure fluctuations or oscillations or torque oscillations and/or speed oscillations, one or more of the following benefits is to be expected:

1. Reduced oil aeration. This results in better cooling, improved valve stability, and improved shift quality.

2. Reduced main oil sump level variation. This results in less oil volume required, thereby reducing cost and weight.

3. Sandwich sump oil level closed loop control. This eliminates the need for a separate oil sump in the hybrid motor housing, thereby reducing cost and complexity.

4. Reduced spin losses. This results in lower cool temperatures (improved reliability) and improved fuel economy.

5. Improved fuel economy. This results in lower operator costs and improved sales.

6. Avoid excessive pressurization of downstream components. This is achieved by reducing the noise associated with excessive aeration. The hydraulic components will see less fatigue stress and thereby provide longer operational life.

7. Reduced cost (eliminates the need for an oil level sensor). Also there is the option of eliminating a separate sump, oil pump, regulator valve, etc.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. An oil level control system for an oil sump of a hybrid electric vehicle, said oil sump including a supply of an oil with an oil level, said oil level control system comprising:
   an electric oil pump constructed and arranged in fluid communication between said oil sump and an oil reservoir, said electric oil pump, including an electric oil pump motor, is constructed and arranged to pump oil from said oil sump to said oil reservoir to lower the oil level of said oil sump; and
   a controller constructed and arranged in electrical communication with said electric oil pump motor for controlling a speed of said electric oil pump motor, said controller being programmed to process parameter readings from said electric oil pump motor, wherein the speed of said electric oil pump motor is varied, based solely on an electric oil pump motor parameter, to maintain a desired oil level of said supply of the oil in said oil sump, wherein said oil sump is a part of a torque converter.

2. The oil level control system of claim 1 wherein said electric oil pump motor parameter is a torque reading.

3. The oil level control system of claim 2 wherein said electric oil pump motor torque reading is sensed by taking a current reading.

4. The oil level control system of claim 1 wherein said electric oil pump motor parameter is a torque oscillation.

5. The oil level control system of claim 4 wherein said electric oil pump motor torque oscillation is sensed by taking a current reading.

6. The oil level control system of claim 1 wherein said electric oil pump motor parameter is a speed oscillation.

7. A liquid control system for managing a liquid level within a liquid supply location, said liquid control system comprising:
   a liquid pump, including a liquid pump motor, constructed and arranged in fluid communication between said liquid supply location and a transfer location, said liquid pump being constructed and arranged to pump liquid from said liquid supply location to said transfer location to lower the liquid level of said liquid supply location; and
   a controller constructed and arranged in electrical communication with said liquid pump motor for controlling a speed of said liquid pump motor, said controller being programmed to intake parameter readings from said liquid pump motor, wherein the speed of said liquid pump motor is varied, based solely on a liquid pump motor parameter, to maintain a desired liquid level of said liquid supply location, wherein said liquid supply location is a part of a torque converter.

8. The liquid control system of claim 7 wherein said liquid pump motor parameter is a torque reading.

9. The liquid control system of claim 8 wherein said liquid pump motor torque reading is sensed by taking a current reading.

10. The liquid control system of claim 7 wherein said liquid pump motor parameter is a torque oscillation.

11. The liquid control system of claim 7 wherein said liquid pump motor parameter is a speed oscillation.

12. An oil level control system for an oil sump of a hybrid electric vehicle, said oil sump including a supply of an oil with an oil level, said oil level control system comprising:
   an electric oil pump constructed and arranged in fluid communication between said oil sump and an oil reservoir, said electric oil pump being constructed and arranged to pump oil from said oil sump to said oil reservoir to lower the oil level of said sump; and a controller constructed and arranged in electrical communication with said electric oil pump for controlling a speed of said electric oil pump, said controller being programmed to take electric oil pump parameter readings, wherein the speed of said electrical oil pump is varied, parameter, to maintain a desired oil level of said supply of the oil in said oil sump, wherein said oil sump is a part of a torque converter.

13. The oil level control system of claim 12 wherein said electric oil pump parameter is a torque reading.

14. The oil level control system of claim 13 wherein said electric oil pump torque reading is sensed by taking a current reading.

15. The oil level control system of claim 12 wherein said electric oil pump parameter is a torque oscillation.

16. The oil level control system of claim 15 wherein said electric oil pump torque oscillation is sensed by taking a current reading.

17. The oil level control system of claim 12 wherein said electric oil pump parameter is a speed oscillation.

18. An oil level control system for an oil sump of a hybrid electric vehicle, said oil sump including a supply of an oil with an oil level, said oil level control system comprising:

an electric oil pump constructed and arranged in fluid communication between said oil sump and an oil reservoir, said electric oil pump, including an electric oil pump motor, is constructed and arranged to pump oil from said oil sump to said oil reservoir to lower the oil level of said oil sump; and a controller constructed and arranged in electrical communication with said electric oil pump motor for controlling a speed of said electric oil pump motor, said controller being programmed to process parameter readings from said electric oil pump motor, wherein the speed of said electric oil pump motor is varied, based on an electric oil pump motor parameter to maintain a desired oil level of said supply of the oil in said oil sump, wherein said oil sump is a part of a torque converter.

\* \* \* \* \*